US007660907B2

(12) United States Patent
Lee

(10) Patent No.: US 7,660,907 B2
(45) Date of Patent: Feb. 9, 2010

(54) TRANSMISSION PACKET FOR PERFORMING MULTI-FUNCTIONS OVER NETWORK AND COMMUNICATION METHOD AND APPARATUS USING THE TRANSMISSION PACKET

(75) Inventor: Kang-hoon Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 771 days.

(21) Appl. No.: 10/377,667

(22) Filed: Mar. 4, 2003

(65) Prior Publication Data
US 2003/0233468 A1 Dec. 18, 2003

(30) Foreign Application Priority Data
Jun. 7, 2002 (KR) ............... 10-2002-0031990

(51) Int. Cl.
*G06F 15/16* (2006.01)
*G06F 3/12* (2006.01)
(52) U.S. Cl. .................. 709/232; 709/203; 709/230; 358/1.15
(58) Field of Classification Search ............ 358/1.15; 709/203, 230, 232
See application file for complete search history.

(56) References Cited
U.S. PATENT DOCUMENTS

| 6,256,662 | B1 |   | 7/2001  | Lo et al.  |         |
|-----------|----|---|---------|------------|---------|
| 6,266,693 | B1 |   | 7/2001  | Onaga      |         |
| 6,473,812 | B2 | * | 10/2002 | Motoyama   | 710/15  |
| 6,734,985 | B1 | * | 5/2004  | Ochiai     | 358/1.15 |
| 6,996,555 | B2 | * | 2/2006  | Muto et al. | 707/3  |
| 7,155,522 | B2 | * | 12/2006 | Iyoki      | 709/227 |
| 2001/0046065 | A1 | * | 11/2001 | Furukawa et al. | 358/1.15 |
| 2002/0046237 | A1 | * | 4/2002 | Yokokura   | 709/203 |
| 2002/0062453 | A1 | * | 5/2002 | Koga       | 713/202 |
| 2002/0069239 | A1 | * | 6/2002 | Katada et al. | 709/202 |
| 2002/0075509 | A1 | * | 6/2002 | Wiechers   | 358/1.15 |

(Continued)

FOREIGN PATENT DOCUMENTS
JP        11-328132       11/1999

(Continued)

OTHER PUBLICATIONS
Japanese Office Action for Application No. 2003-159519; dated Jun. 13, 2006.

*Primary Examiner*—Nathan J Flynn
*Assistant Examiner*—Joshua Joo
(74) *Attorney, Agent, or Firm*—Staas & Halsey LLP

(57) ABSTRACT

A transmission packet usable to perform multiple operations including scanning and is transmitted via a network in order to achieve communications in at least one server shared by at least one client via the network. The transmission packet includes a version field, a packet form display field, an operation form display field, an attribute group field and/or a data group field, and an end field. The packet form display field has packet form display information that represents a form in which the transmission packet is generated. The operation form display field has operation form display information that represents a form of an operation using the transmission packet. The attribute group field and/or a data group field have one of first information associated with attributes of the operation and second information associated with data regarding the operation.

29 Claims, 8 Drawing Sheets

U.S. PATENT DOCUMENTS

| | | | |
|---|---|---|---|
| 2002/0089687 A1* | 7/2002 | Ferlitsch et al. | 358/1.15 |
| 2003/0123082 A1* | 7/2003 | Hall et al. | 358/1.15 |
| 2005/0200895 A1* | 9/2005 | Isoda et al. | 358/1.16 |
| 2006/0069725 A1* | 3/2006 | Yokokura | 709/203 |
| 2006/0170967 A1* | 8/2006 | Maki et al. | 358/1.15 |
| 2006/0271936 A1* | 11/2006 | Matsuda et al. | 718/102 |

FOREIGN PATENT DOCUMENTS

| | | |
|---|---|---|
| JP | 2000-200232 | 7/2000 |
| JP | 2000-284937 | 10/2000 |
| JP | 2002-152308 | 5/2002 |

* cited by examiner

TRANSMISSION PACKET FOR PERFORMING MULTI-FUNCTIONS OVER NETWORK AND COMMUNICATION METHOD AND APPARATUS USING THE TRANSMISSION PACKET

CROSS-REFERENCE TO RELATED APPLICATION

This application claims the benefit of Korean Patent Application No. 02-31990, filed Jun. 7, 2002 in the Korean Intellectual Property Office, the disclosure of which is incorporated herein by reference.

BACKGROUND OF THE INVENTION

1. Field of the Invention

The present invention relates to the execution of multiple functions, such as scanning, printing, and faxing, and more particularly, to a transmission packet used to perform multiple functions over a network and a communication method and apparatus to perform the multi-functions using the transmission packet.

2. Description of the Related Art

Only one Internet printing protocol (IPP) exists for controlling printers through the Internet. However, while there are no protocols used to control scanners through the Internet, scanned documents are currently transmitted to clients through the Internet. For example, the U.S. Pat. No. 6,256,662 discloses a conventional method of transmitting scanned documents through the Internet. In the disclosed conventional method, documents are scanned using a multi-functional peripheral apparatus, such as a server, over a network according to a client's instruction. The scanned documents are then transmitted to the client over the network. In other words, in order to receive the scanned documents, the client must first open a scanning associated application, and the scanning order from the client must be given.

As described above, the conventional method cannot perform a scanning without a client's instruction. Also, according to the conventional method, if a client does not open a scanning associated application, the scanned documents are not transferred to the client. Also, in the conventional method, it is impossible to find a server having a scanning function among several servers. Furthermore, the scanning by a server cannot be controlled, the state of the server for scanning cannot be checked, and the server itself cannot be controlled. In addition, in the conventional method, there is a possibility that a client cannot properly receive the scanned documents from a server. Furthermore, a network scanning protocol according to the disclosed conventional method depends on the operating systems of a server and a client, thus increasing the restrictions on the design of a scanning protocol.

As a result, in the conventional method, clients cannot share a multi-functional peripheral apparatus over a network. Also, the conventional method requires an extra management protocol in order for a server to control clients.

SUMMARY OF THE INVENTION

To solve the above-described and/or other problems, it is an aspect of the present invention to provide a multi-functional transmission packet for use in performing multiple operations, including a control operation between servers and clients over a network irrespective of the state of the clients.

It is another aspect of the present invention to provide a communication method for use in performing multiple functions over a network using the transmission packet.

It is a further aspect of the present invention to provide a communication apparatus for use in performing multiple functions over a network using the transmission packet.

Additional aspects and advantages of the invention will be set forth in part in the description which follows and, in part, will be obvious from the description, or may be learned by practice of the invention.

To achieve the above and/or other aspects, an aspect of the present invention provides a transmission packet which performs at least K ($K \geq 1$) operations including scanning, and is transmitted over a network in order to achieve communications between N ($N \geq 1$) servers shared by M ($M \geq 1$) clients via the network.

According to an aspect of the invention, the transmission packet includes a version field, a packet form display field, an operation form display field, an attribute group field and/or a data group field, and an end field, where the version field has version information representing a version number of the transmission packet, the packet form display field has packet form display information that represents a form in which the transmission packet is generated, the operation form display field has operation form display information that represents a form of an operation using the transmission packet among the K operations, the attribute group field and/or a data group field have at least one of first information associated with attributes of the operation and second information associated with data regarding the operation, and the end field has end information representing the end of the packet.

Another aspect of the present invention provides a communication method of performing an operation between a client and a server using the transmission packet, the communication method including selecting a server having a desired attribute among attributes associated the server and the attributes of the operation to be performed, checking a current status of the discovered server, selecting the server capable of receiving information using the checked status of the discovered server, requiring the selected server to asynchronously notify an event, and performing the operation between the client and the server.

A further aspect of the present invention provides a communication apparatus which performs an operation between a client and a server using the transmission packet, the communication apparatus including a client which broadcasts a desired attribute among the attributes associated with a server and an operation to be performed in order to require server having the desired attribute to disclose its identity, checks a current status of the disclosed server, selects the disclosed server capable of receiving information using the checked server status, requires the selected server to asynchronously notify an event, and transmits the attributes and data necessary to perform the operation to the server.

According to an aspect of the present invention, the server responds with information on whether the server has the desired attribute, responds to a request for the current status of the server, responds to a request for asynchronously notifying the event, receives the attributes and data necessary to perform the operation, and performs the operation using the received attributes and data.

BRIEF DESCRIPTION OF THE DRAWINGS

The above and/or other aspects and advantages of the present invention will become more apparent by describing in detail embodiments thereof with reference to the accompanying drawings in which.

DETAILED DESCRIPTION OF THE EMBODIMENTS

Figure 1:
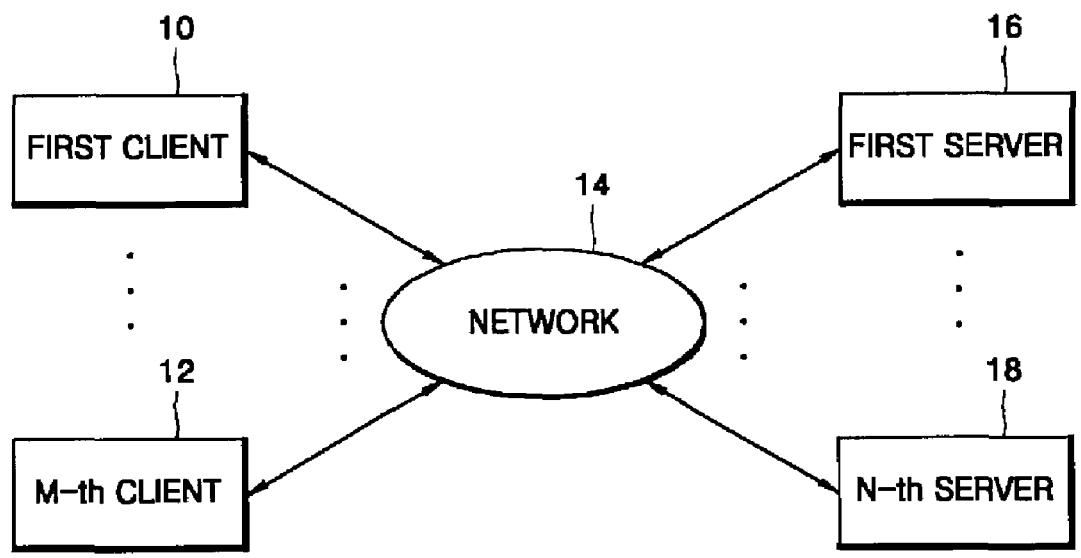
FIG. 1 is a schematic view of a transmission of a transmission packet according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A transmission packet which performs multiple functions over a network according to the present invention will now be described with reference to the accompanying drawings. FIG. 1 illustrates a transmission of a transmission packet according to an embodiment of the present invention. The transmission packet is transmitted over a network 14 between first through M-th clients 10, ..., and 12 and first through N-th servers 16, ..., and 18. Here, M and N are equal to or greater than 1. The network 14 can be any network including wired and wireless networks.

Referring to FIG. 1, each of the first through N-th servers 16, 18 performs K (K≧1) operations. According to an aspect of the invention, the operations include at least a scanning operation. The first through N-th servers 16, 18 are shared by the first through M-th clients 10, 12 through a network 14. The operations performed by each of the first through N-th servers 16, and 18 include scanning, faxing, printing, copying, and/or data transmission. However, it is understood that other operations could be included.

Figure 2:
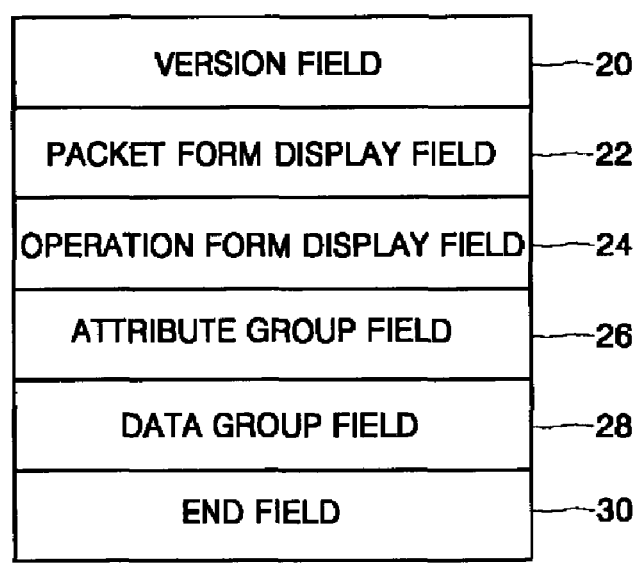
FIG. 2 shows the format of a transmission packet according to an embodiment of the present invention.

A transmission packet of the present invention transmitted to perform multiple functions between the client 10 or 12 and the server 16 or 18 over the network 14 will now be described with reference to FIG. 2. Referring to FIG. 2, the transmission packet includes a version field 20, a packet form display field 22, an operation form display field 24, an attribute group field 26, a data group field 28, and an end field 30. The version field 20 has version information representing the version number of the packet. If the version field 20 is composed of 2 bytes, the first byte corresponds to the version information representing the major version number, and the second byte corresponds to the version information representing the minor version number. The packet form display field 22 has packet form display information representing the generation form of the transmission packet (i.e., represents for which purpose a packet is generated).

Here, the generation form of the packet which includes the packet form display information can be at least one among a request purpose, a response purpose, and a trap purpose. As described above, between the client 10 or 12 and the server 16 or 18, a transmission packet can be generated as a request for a predetermined action, or as a response to the requested action. Alternatively, the transmission packet can be generated as a trap for the server 16 or 18 to inform the client 10 or 12 of a certain fact although the client 10 or 12 has not requested any action from the server 16 or 18. The transmission packet can also be generated for at least two composite purposes among the request purpose, the response purpose, and the trap purpose. That is, the trap information can be added to a transmission packet for responding to the client's 10 or 12 request from the server 16 or 18, and the response transmission packet with the trap information can be transmitted from the server 16 or 18 to the client 10 or 12. Accordingly, when the server 16 or 18 makes a request from or responds to the client 10 or 12, the server 16 or 18 can report an error through the trap transmission packet.

If the packet form display field 22 is composed of one byte, the packet form display information included in the display field 22 can be expressed as in Table 1.

TABLE 1

| "high" logic level location at one byte | Packet form display information |
| --- | --- |
| 0x01 | For request |
| 0x02 | For response |
| 0x04 | For trap |

Here, "0x" indicates that the values 01, 02, and 04 following "0x" are hexa values.

The operation form display field 24 of FIG. 2 has operation form display information representing the form of an operation using a packet among the K operations of each server. For example, if the operation form display field 24 is formed of one byte, the operation form display information can be expressed as in Table 2.

TABLE 2

| "high" logic level location at one byte | Operation form display information |
| --- | --- |
| 0x01 | For printing |
| 0x02 | For scanning |
| 0x04 | For faxing |
| 0x08 | For controlling the operation of a set for MFP |
| 0xFF | For controlling all operations, such as printing, scanning, and faxing |

The attribute group field 26 has first information associated with the attribute of an operation to be performed in a server. The data group field 28 has second information associated with data for an operation to be performed in a server. According to an aspect of the present invention, the packet of FIG. 2 can have at least one among the attribute group field 26 and the data group field 28. That is, a transmission packet according to the present invention can have either the attribute group field 26 or the data group field 28, or both fields 26, 28.

Figure 3:
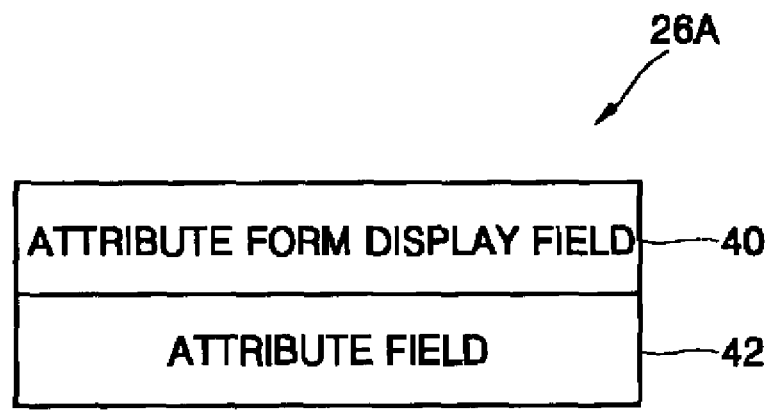
FIG. 3 shows an embodiment of the attribute group field of FIG. 2.

Hereinafter, an embodiment of the attribute group field 26 will be described. FIG. 3 shows the format of an attribute group field 26A of FIG. 2. The attribute group field 26A includes an attribute form display field 40 and an attribute field 42. The attribute form display field 40 of FIG. 3 has attribute form display information representing the form of an attribute-related operation. Here, the attribute form display information can be at least one of the control attribute of an operation, the state of the server 16 or 18, and the information attribute of the server 16 or 18.

The aforementioned first information includes the attribute of an operation and the attribute form display information. For example, if the attribute form display field 40 is composed of one byte and an operation capable of being performed in each server 16 or 18 is printing, scanning, or faxing, a list of attribute form display information can be expressed as in Table 3.

TABLE 3

| "high" logic level position in one byte | Attribute form display information |
|---|---|
| 0x01 and 0x02 | Withheld to be used later |
| 0x03 | Control attributes of a server |
| 0x04 | State attributes of the server |
| 0x05 | Information attributes of the server |
| 0x06~0x0F | Withheld for attributes of the other servers |
| 0x11 | Attributes of a printing operation |
| 0x12 | Printing operation control attributes |
| 0x13 | Printing control attributes |
| 0x14 | Printing state attributes |
| 0x15 | Printing information attributes |
| 0x16~0x1F | Withheld for attributes of the other printing operations |
| 0x20 | Withheld for scanning attributes |
| 0x21 | Attributes of a scanning operation |
| 0x22 | Scanning operation control attributes |
| 0x23 | Scanning control attributes |
| 0x24 | Scanning state attributes |
| 0x25 | Scanning information attributes |
| 0x26~0x2F | Withheld for attributes of the other scanning operations |
| 0x30 | Withheld for faxing attributes |
| 0x31 | Attributes of a faxing operation |
| 0x32 | Faxing operation control attributes |
| 0x33 | Faxing control attributes |
| 0x34 | Faxing state attributes |
| 0x35 | Faxing information attributes |
| 0x36~0x3F | Withheld for attributes of the other faxing operations |
| 0x40~0xFF | Withheld to be used later |

In Table 3, the printing operation attributes, the scanning operation attributes, and the faxing operation attributes are used to set values that are used to perform printing, scanning, and faxing, respectively. The printing operation control attributes, the scanning operation control attributes, and the faxing operation control attributes are used to control operations, such as, to control a printing operation, a scanning operation, and a faxing operation, respectively, or change the priority order of the operations. The server control attributes, the printing control attributes, the scanning control attributes, and the faxing control attributes are used to control the server 16 or 18. The server state attributes, the printing state attributes, the scanning state attributes, and the faxing state attributes are used to ask the state of the server 16 or 18 or the client 10 or 12. The server information attributes, the printing information attributes, the scanning information attributes, and the faxing information attributes are used to ask the information of the server 16 or 18 or the client 10 or 12.

As can be seen from Table 3, in the present invention, the attribute form display field 40 has at least one field whose use is not determined but is withheld.

Figure 4:
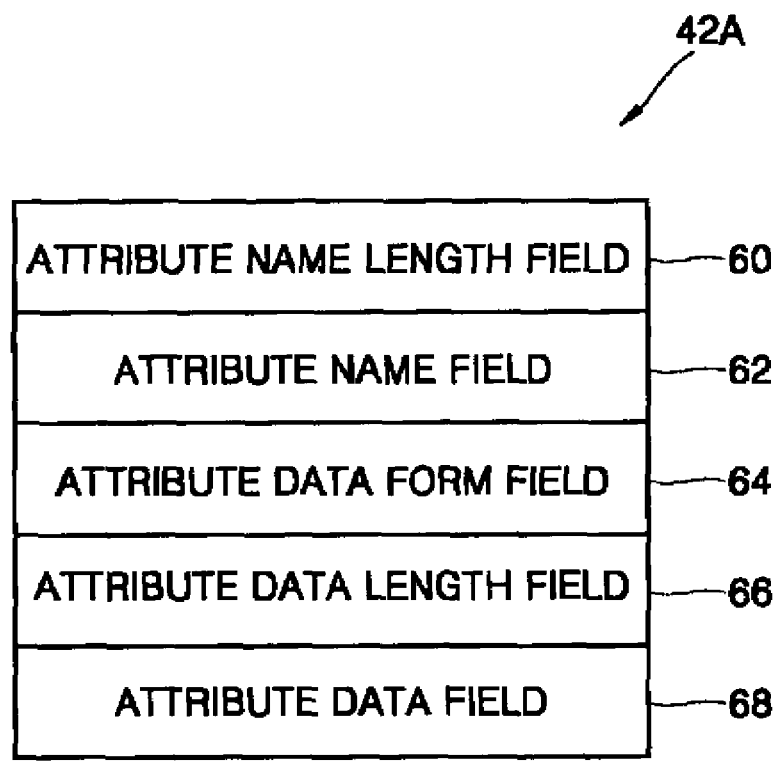
FIG. 4 shows an embodiment of the attribute field of FIG. 3.

Hereinafter, an embodiment of the attribute field 42 will be described. FIG. 4 shows an attribute field 42A, which is an embodiment of the attribute field 42 of FIG. 3. The attribute field 42A includes an attribute name length field 60, an attribute name field 62, an attribute data form field 64, an attribute data length field 66, and an attribute data field 68. Referring to FIG. 4, the attribute name field 62 represents the name of an attribute, and, for example, can be composed of 1 to 65535 bytes. The attribute name length field 60 represents the length of the attribute name of the attribute name field 62. For example, the attribute name length field 60 can be composed of 2 bytes. The attribute data field 68 has attribute data related to the attribute. For example, the attribute data field 68 can be composed of 1 to 65535 bytes. The attribute data form field 64 has attribute data form information representing the form of the attribute data of the attribute data field 68. If the attribute data form field 64 is composed of one byte, a list of attribute data form information can be expressed as in Table 4.

TABLE 4

| "high" logic level position in one byte | Attribute data form information |
|---|---|
| 0x01 | Signed byte |
| 0x02 | Unsigned byte |
| 0x03 | Signed word |
| 0x04 | Unsigned word |
| 0x05 | Signed long |
| 0x06 | Unsigned long |
| 0x07 | Signed float |
| 0x08 | Unsigned float |
| 0x09 | String having null byte at the end |
| 0x0A | Internet Protocol (IP) address form for network IP address |
| 0x0B | A series of bytes |
| 0x0C | Two byte characters |
| 0x0D | A series of unicodes |

Here, the attribute data form information are bytes, words, longs, or floats because an effective message can be obtained by dividing and interpreting the attribute data of the attribute data field 68 in units of one byte, 2 bytes, 4 bytes, or 8 bytes. As can be seen from Table 4, the attribute data form information of the attribute data form field 64 represents whether the attribute data included in the attribute data field 68 has a sign, or represents the effective length of the attribute data for representing an effective message (i.e., one byte, 2 bytes, 4 bytes, or 8 bytes). Here, the attribute data length field 66 has information on the length of the attribute data of the attribute data field 68. For example, the attribute data length field 66 can be composed of 2 bytes.

Hereinafter, a data group field 28A, which is an embodiment of the data group field 28 of FIG. 2, will be described with reference to FIG. 5. The data group field 28A is composed of a data form display field 80 and a data field 82. The data form display field 80 of FIG. 5 has a data operation form information representing the form of an operation that uses the data included in the data field 82. For example, if the data operation form information is composed of one byte, and printing, scanning, or faxing can be operated in each server 16 or 18, the data operation form information can be expressed as in Table 5.

TABLE 5

| "high" logic level position in one byte | Data operation form information |
|---|---|
| 0x80 | The entire operation |
| 0x81~0x8F | Withheld to be used later |
| 0x90 | Printing operation |
| 0x91~0x9F | Withheld to be used later |
| 0xA0 | Scanning operation |
| 0xA1~0xAF | Withheld to be used later |
| 0xB0 | Faxing operation |
| 0xB1~0xFF | Withheld to be used later |

As can be seen from Table 5, in the present invention, the data form display field 80 can have at least one field whose use is not determined but is withheld for later use.

Figure 5:
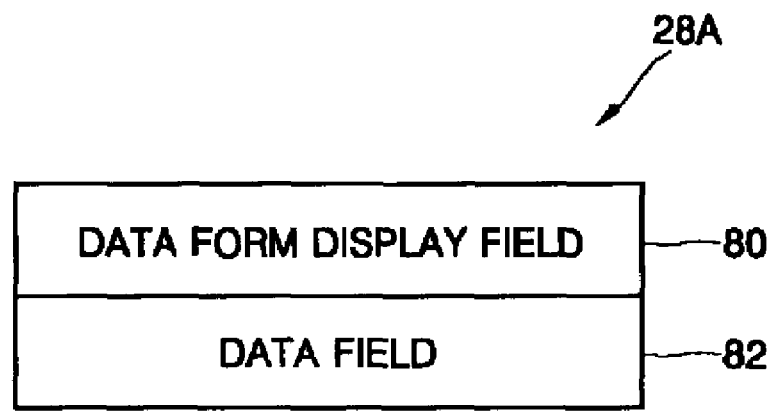
FIG. 5 shows an embodiment of the data group field of FIG. 2.

The data field 82 of FIG. 5 has third information regarding data and the data itself. The third information and the data operation form information correspond to the aforementioned second information.

Hereinafter, a data field 82A, which is an embodiment of the data field 82 of FIG. 5, will be described with reference to FIG. 6. The data field 82A includes a data external form display field 100, a data order field 102, a data length field 104, and a data sub-field 106. The data sub-field 106 of FIG. 6 has the data itself. The data external form display field 100 has data external form information representing the external form of the data included in the data sub-field 106. If the data external form information is composed of one byte, it can be expressed as in Table 6.

TABLE 6

| "high" logic level position in one byte | Data external form information |
|---|---|
| 0x01 | Text form |
| 0x02 | Binary form |
| 0x04 | Compressed form |

As can be seen Table 6, the data included in the data sub-field 106 can be given in a compressed form, a text form, or a binary form, or in at least two forms among the compressed form, the text form, and the binary form. For example, the data included in the data sub-field 106 can have a compressed binary form or a compressed text form.

Figure 6:
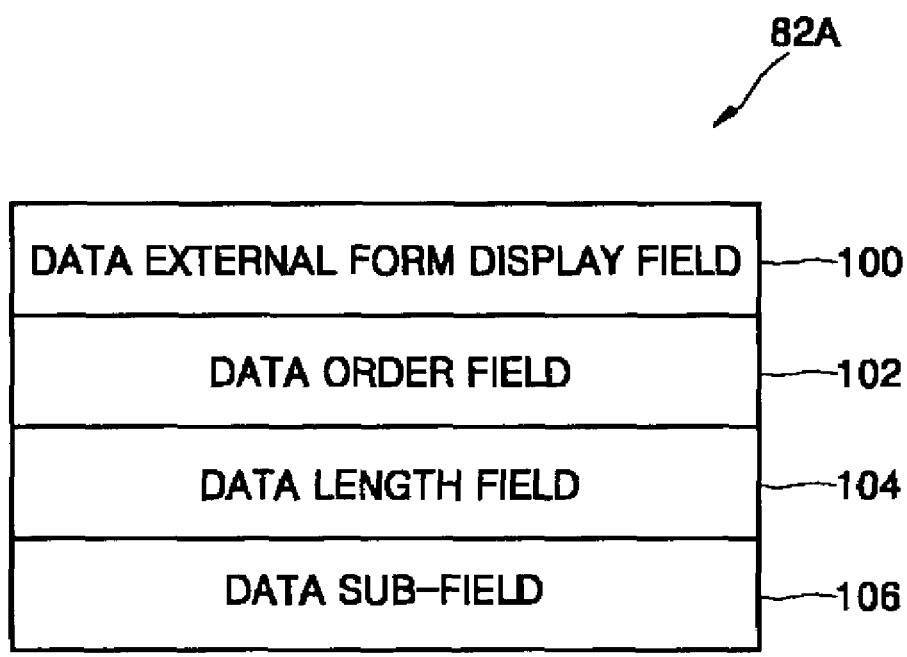
FIG. 6 shows an embodiment of the data field of FIG. 5.

The data order field 102 of FIG. 6, when the data sub-field 106 has segmented data, has order information representing the order of the data before being segmented. For example, the data order field 102 is composed of two bytes. If data is segmented and the segmented data are stored in the data sub-field 106, the order information represents the order of data segment. The data length field 104 has data length information regarding the length of the data included in the data sub-field 106. For example, the data length field 104 can be composed of 4 bytes.

The data external form information included in the data external form display field 100 of FIG. 6, the data length information included in the data length field 104, and the order information included in the data order field 102 correspond to the third information.

Referring back to FIG. 2, the end field 30 has end information representing the end of a packet. For example, the end field 30 can be composed of one byte and expressed as 0x00.

Hereinafter, an embodiment of a communication method for performing multiple functions using the above-described transmission packet, according to the present invention, and a communication apparatus performing the method will be described with reference to the accompanying drawings.

Figure 7:
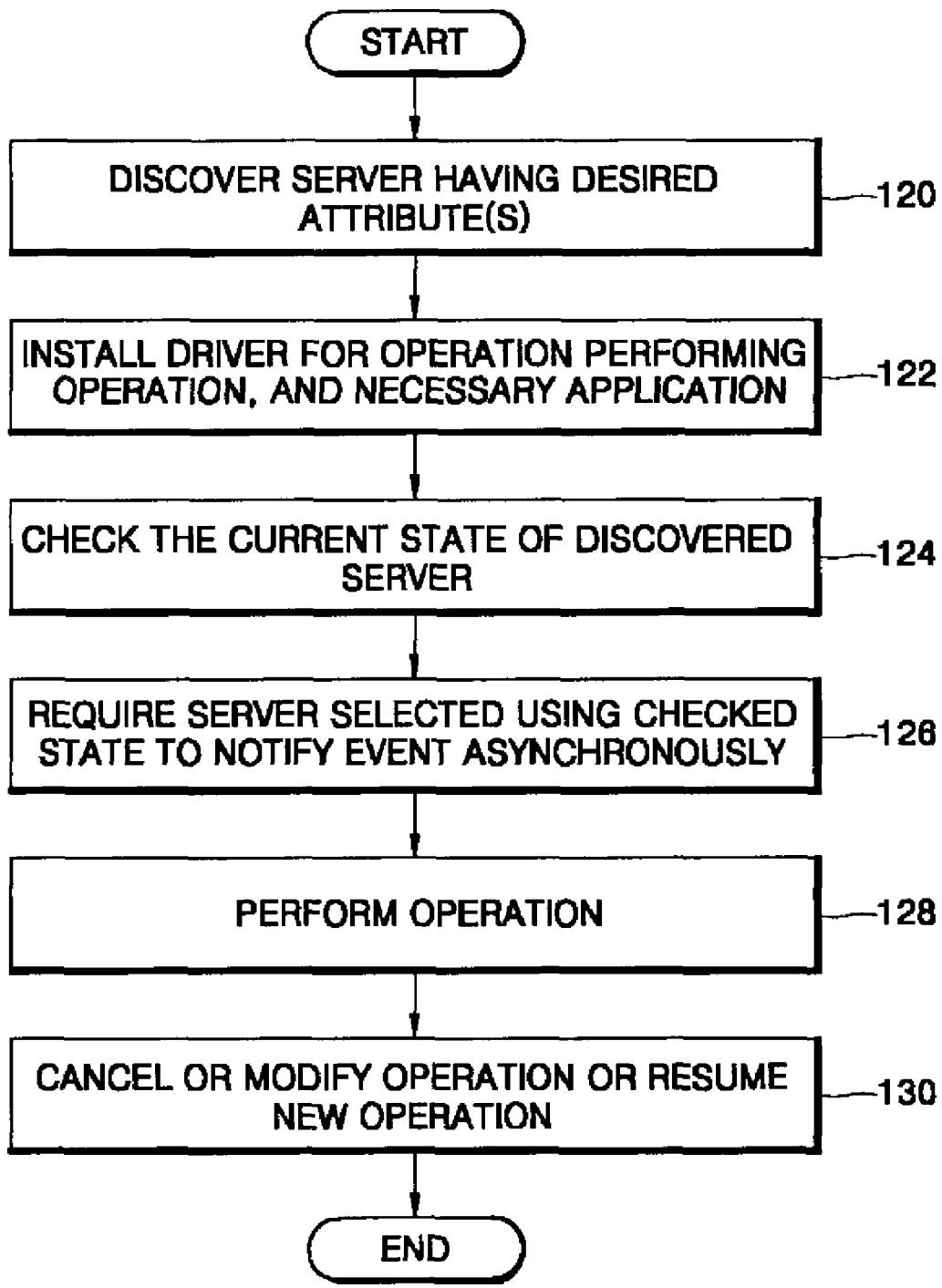
FIG. 7 is a flowchart illustrating a communication method of performing multiple functions using the above-described transmission packet, according to an embodiment of the present invention.

FIG. 7 is a flowchart illustrating an embodiment of a communication method of performing an operation corresponding to multiple functions using the above-described transmission packet. The method includes discovering a server having a desired attribute (operation 120), asking a server selected from the discovered servers to notify of an asynchronous event (operations 122 through 126)), and performing operations and selectively changing the performed operations (operations 128 and 130). The method of FIG. 7 can be instructions encoded on a computer readable medium or media for use by the clients 10, 12 and/or servers 16, 18.

In the communication method, the client 10, or 12 discovers among the first through N-th servers 16 and 18, the server 16 or 18 having a desired attribute from attributes regarding the servers 16 and/or 18 and attributes regarding the operation to be performed in the servers 16, 18 (operation 120). Here, the attributes regarding the servers 16, 18 and/or operations indicate at least one among the number of operations performed by the server 16 or 18, the spatial positions of the servers 16 and 18, whether the servers 16 and 18 can support security, whether the servers 16 and 18 are required to be authenticated before being used, whether the servers 16 and 18 perform operations in color, the resolutions of the results of the operations to be performed by the servers 16 and 18, and the size of paper that the servers 16 and 18 can handle. It is understood that other attributes may be included depending on the needs of the clients 10, 12.

Figure 8:
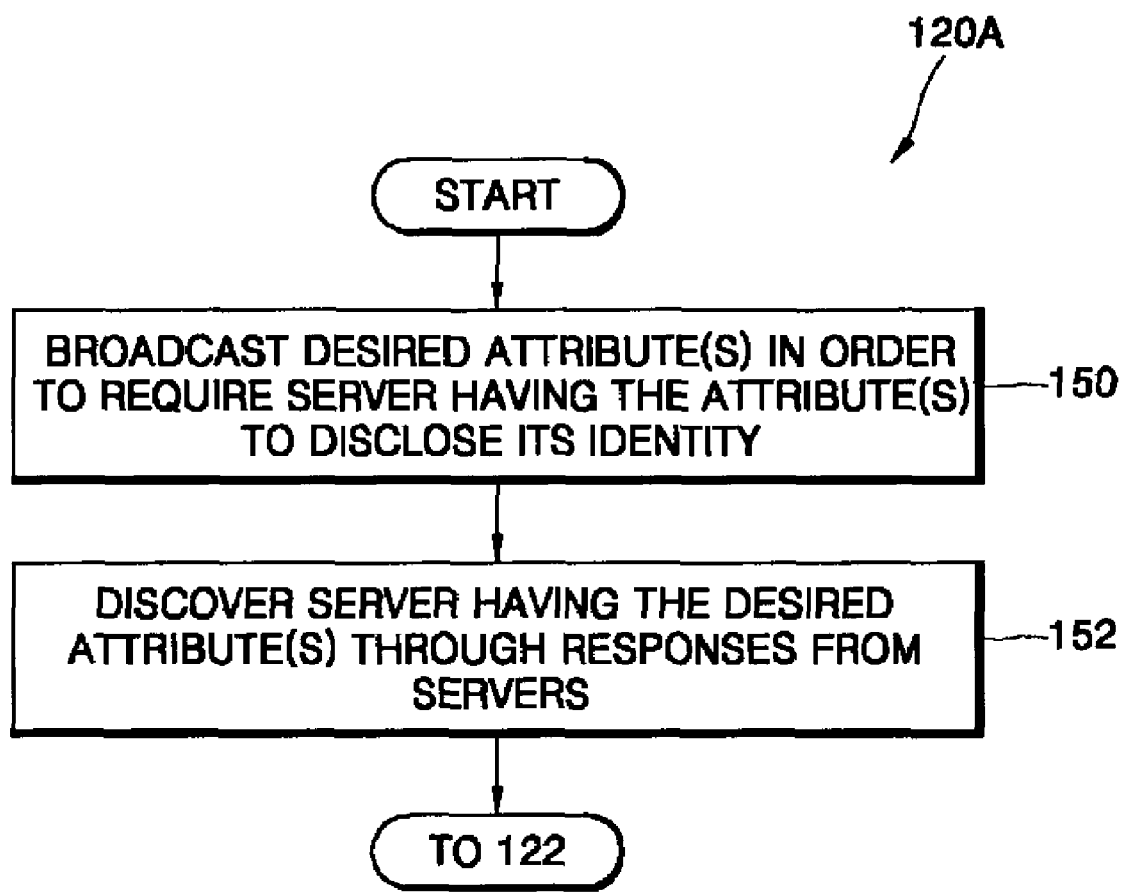
FIG. 8 is a flowchart illustrating an embodiment of operation 120 of FIG. 7.

FIG. 8 is a flowchart for illustrating an operation 120A, which is an embodiment of operation 120 of FIG. 7. The operation 120A includes discovering the server 16 or 18 having a desired attribute by broadcasting the desired attribute (operations 150 and 152). A client 10 or 12 broadcasts a desired attribute to the servers 16 and 18 and requires the server 16 or 18 having the desired attribute to disclose its identity (operation 150). After operation 150, the N servers 16, ..., and 18 inform the client 10 or 12 of information on whether they have the desired attribute. The client 10 or 12 discovers the server 16 or 18 having the desired attribute through the information received from the servers 16 and 18 (operation 152).

Referring back to FIG. 7, after operation 120, the client 10 or 12 installs a driver if necessary for operation execution using the discovered server 16 or 18, and selectively installs an application for the operation execution (operation 122). For example, for printing and faxing, the client 10 or 12 needs to install the necessary driver. For scanning, the client 10 or 12 does not need to install the driver. Therefore, for all of printing, scanning, and faxing, the client may or may not install the application.

For example, the client 10 or 12 requests, from the discovered server 16 or 18, the driver and application for the operation execution that need to be installed. Here, the discovered server 16 or 18 provides the client 10 or 12 with the driver and application requested by the client 10 or 12 in the form of a file or a universal resource location (URL). The client 10 or 12 installs the driver and application according to information received from the server 16 or 18.

After operation 122, the client 10 or 12 checks the current state of the discovered server 16 or 18 (i.e., the server 16 or 18 that disclosed that it has the desired attribute) (operation 124). That is, the client 10 or 12 requests the discovered server 16 or 18 to tell its current state, and the requested server 16 or 18 responds to the client 10 or 12 with the current state of the requested server 16 or 18. At this time, according to an aspect of the present invention, the client 10 or 12 may also check the ability of the server 16 or 18 together with the current state of the server 16 or 18.

The current state and/or ability of server 16 or 18 to be checked indicates at least one of the unchangeable ability among the abilities of the server 16 or 18, the changeable state of the server 16 or 18 (e.g., running out of paper), whether the operation that the client 10 or 12 previously requested from the server 16 or 18 exists, the progress state of the operation that the client 16 or 18 requires the server 16 or 18 to perform (i.e., whether the operation is in stand-by state, being performed, or completed), whether the server 16 or 18 can perform the operation required by the client 10 or 12, and the priority order in which the operation required by the client 10 or 12 is performed, and the number of times of executions of the operation.

Also, according to an aspect of the invention, no matter what manner is used for the communications between the client 10 or 12 and the server 16 or 18, the client 10 or 12 can check the current state of the server 16 or 18. For example, regardless of whether the communications between the client 10 or 12 and the server 16 or 18 are performed in a point-to-point manner or a multi-to-multi manner, the client 10 or 12 can check the current state of the server 16 or 18.

In the present invention, the communication method of FIG. 7 need not include operation 122. That is, if scanning is the operation to be performed among the operations that can be performed between the client 10 or 12 and the server 16 or 18 across the network 14, the client 10 or 12 does not need to install a driver. In this case, if the client 10 or 12 does not need to install an application, the method of FIG. 7 does not include operation 122. If the method of FIG. 7 does not include operation 122, the client checks the current state of the discovered server, after operation 120. While an example is used in which the scanning operation does not require a driver, it is understood that, according to the clients 10, 12 and servers 16, 18 utilized, others of the operations including faxing and printing may also not need to include a driver, and conversely, that the scanning may require a driver.

After operation 124, the client 10 or 12 selects the server 16 or 18 capable of receiving information, using the checked current state of the server 16 or 18, and requires the selected server 16 or 18 to notify an event in an asynchronous trap manner (operation 126). That is, the client 10 or 12 subscribes to the asynchronous notification in the server 16 or 18.

The notification manner can differ depending on the type of generated events. For example, the server 16 or 18 may periodically notify a generated event to the client 10 or 12 or notify intermittently whenever the event is generated. The event indicates at least one among the current states of the operation performed by the server 16 or 18, whether the operation performed by the server 16 or 18 is completed, whether the results of the performance of operation exist (i.e., whether a scanned document exists or whether a document received from an external source through a fax machine exists), whether it is necessary for the client 10 or 12 to re-transmit to the server 16 or 18 information necessary to perform the operation due to fatal errors, whether a situation affecting the operation while it is waiting (e.g., "out of paper" or "toner low") is generated, and whether effective data to be processed is generated. Accordingly, the server 16 or 18 which is requested to asynchronously notify the event notifies the client that the event has occurred. In the present invention, when the server 16 or 18 notifies that the event has occurred, registered information regarding clients 10 and 12 not notified of the event may be erased from the server 16 or 18.

After operation 126, the client 10 or 12 and the server 16 or 18 perform an operation (operation 128).

Figure 9:
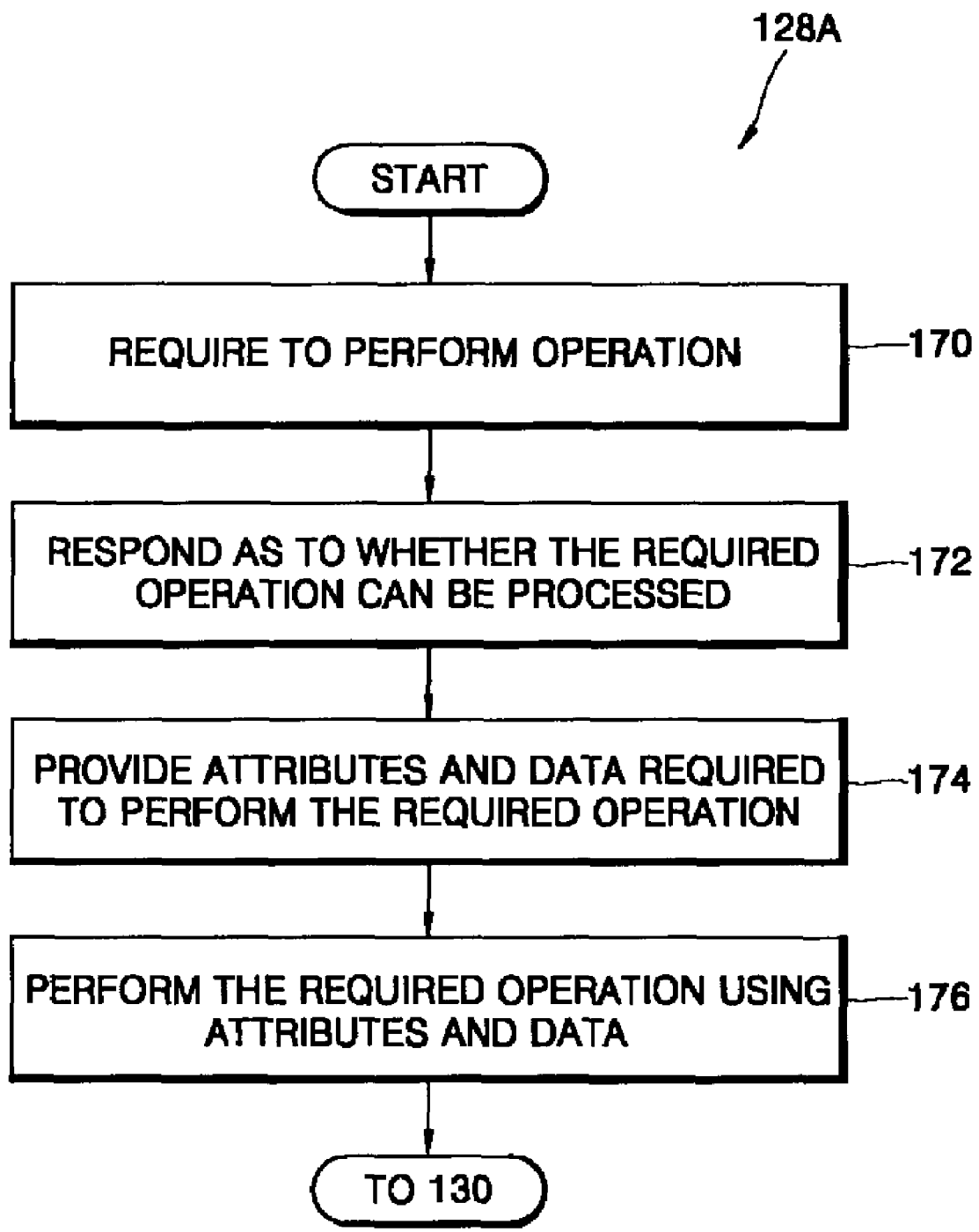
FIG. 9 is a flowchart illustrating an embodiment of operation 128 of FIG. 7.

Hereinafter, embodiments of operation 128 of FIG. 7 will be described with reference to the drawings. FIG. 9 is a flowchart for illustrating operation 128A, which is one embodiment of operation 128 of FIG. 7. Operation 128A includes requiring the server 16 or 18 to perform the operation (operation 170) and performing the operation according to whether the required operation can be performed (operations 172, 174, 176). After operation 126, the client 10 or 12 requires the server 16 or 18 to perform the operation that the client 10 or 12 can order the server 16 or 18 to perform. Such operations include, but are not limited to, printing or faxing (operation 170). After operation 170, the server 16 or 18 required to perform the operation responds to the client 10 or 12 whether the server 16 or 18 can process the requested operation (operation 172). For example, the client 10 or 12 inquires of each server 16 or 18 which function the server 16 or 18 has, to what extent the server 16 or 18 can perform its functions, and the like, in operation 170. Each server 16 or 18 responds to the inquiries about the type of functions that the server 16 or 18 has and the degree to which the functions of the server 16 or 18 can be performed (operation 172).

After operation 172, the client 10 or 12 receives a response as to whether the required operation can be processed from the server 16 or 18, analyzes the received response in order to determine whether the server 16 or 18 can process the required operation, and lets the server 16 or 18 perform the required operation if it is determined that the operation can be processed (operations 174 and 176). To be more specific, if it is determined that the server 16 or 18 can process the required operation, the client 10 or 12 provides the server 16 or 18 with the attributes of the required operation and the operation data necessary to perform the required operation (operation 174). Here, the operation data can be transmitted from the client 10 or 12 to the server 16 or 18 in the form of a file, a raw data, or an address having a file. After operation 174, the server 16 or 18 performs the required operation using the received attributes and operation data (operation 176).

Figure 10:
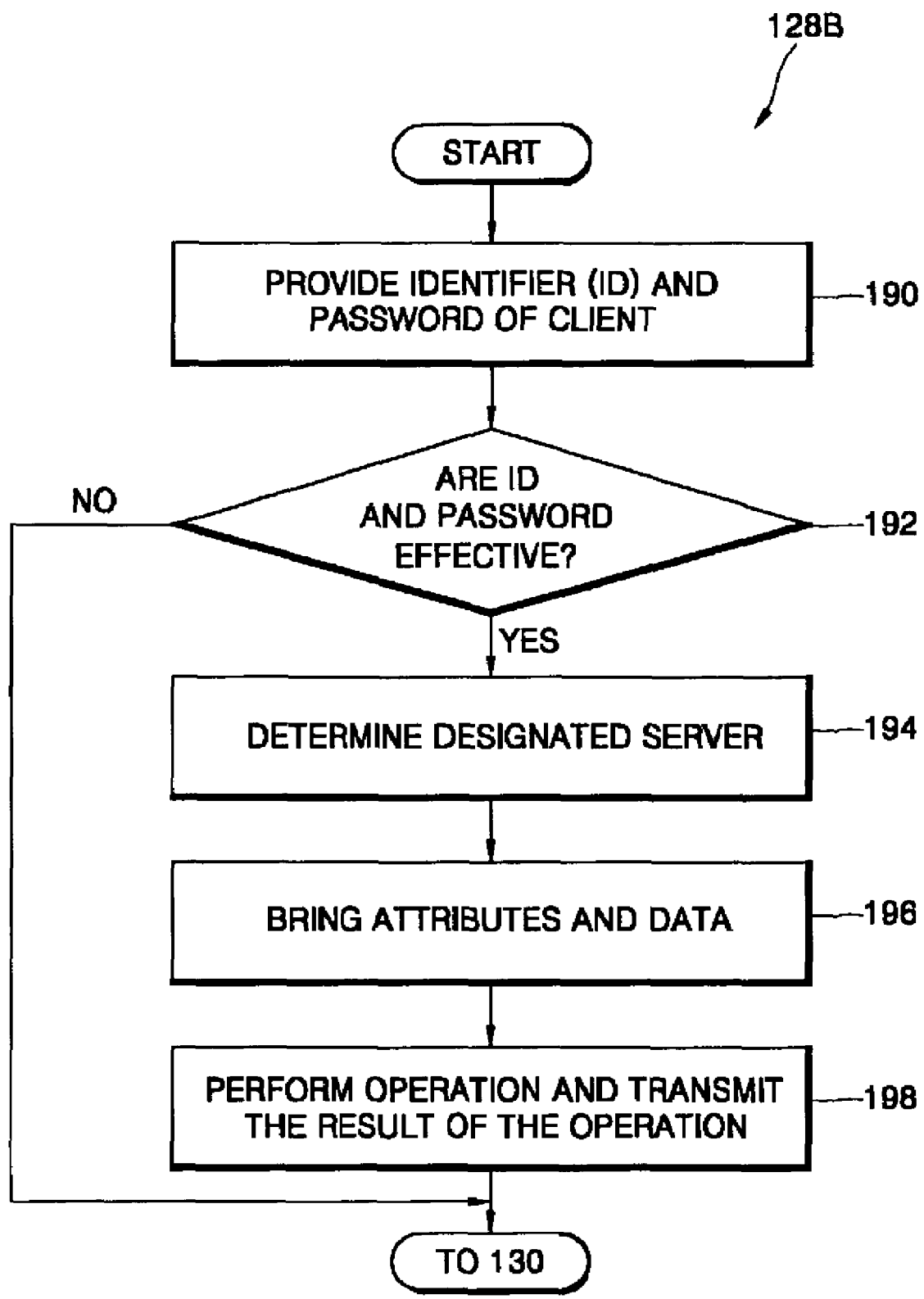
FIG. 10 is a flowchart illustrating another embodiment of operation 128 of FIG. 7.

FIG. 10 is a flowchart illustrating operation 128B, which is another embodiment of operation 128 of FIG. 7. Step 128B includes operations 190 through 198 of performing an operation when the identifier and password of the client provided by an external source are effective. After operation 126, the client 10 or 12 designates the desired server 16 or 18 to perform scanning among the servers 16 and 18 (operations 190, 192, 194). To be more specific, a user who tries to scan a document using an arbitrary server 16 or 18 and to transmit the scanned document to his or her client 10 or 12 provides the identifier and password of the client 10 or 12 to the arbitrary server 16 or 18 (operation 190). In this case, the client 10 or 12 provides the identifier, password, and spatial position of the client 10 or 12 to the server 16 or 18 including the arbitrary server 16 or 18 (operation 190). After operation 190, the server 16 or 18 provided by the user with the identifier and the password determines whether they are effective (operation 192). If it is determined that the identifier and password provided by the user are not effective, the operation is not performed. However, it is determined that the provided identifier and password are effective, the server 16 or 18 provided with the identifier and password is determined as the designated server 16 or 18 (operation 194).

After operation 194, the designated server 16 or 18 receives the attributes and data necessary to perform the operation from the client 10 or 12 located on the space corresponding to the identifier (operation 196). That is, the client 10 or 12 required by the designated server 16 or 18 to transmit the attributes and data can recognize that the server 16 or 18 is supposed to scan a document. In addition, as described above, the server 16 or 18 brings necessary attributes and data from the client 10 or 12 as needed, and does not need to store in the server the attributes and data. Accordingly, the server 16 or 18 does not need to store the attributes or data of the client 10 or 12.

After operation 196, the server 16 or 18 performs an operation using the attributes and data and transmits the operation result to the client 10 or 12 every time the operation is performed (operation 198).

Referring back to FIG. 7, after operation 128, the client 10 or 12 can correct the progress of the operation to be performed by the server 16 or 18 (operation 130). For example, the client 10 or 12 can require the server 16 or 18 to cancel or modify the performance of the previously required operation, or to pause performing the previously required operation and resume the operation. Here, a plurality of operations previously required by the client 10 or 12 can be cancelled at the same time.

According to the present invention, the communication method of FIG. 7 may not include operation 130. In this case, after operation 176 of FIG. 9, or after operation 198 of FIG. 10, the communication method of FIG. 7 is concluded.

Figure 11:
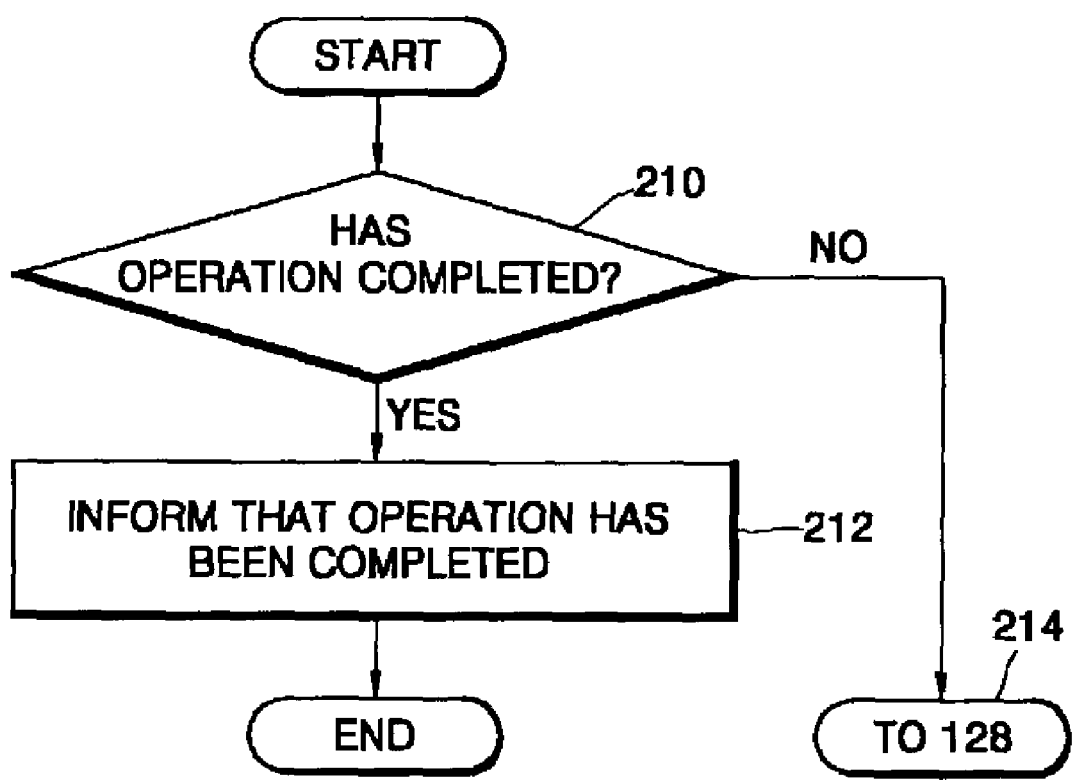
FIG. 11 is a flowchart illustrating a communication method of performing multiple functions using the above-described transmission packet, according to a another embodiment of the present invention.

FIG. 11 is a flowchart illustrating another embodiment of the communication method of FIG. 7. The embodiment in FIG. 11 further includes informing the client 10 or 12 that the operation is completely performed (operations 210 and 212). Specifically, the server 16 or 18 determines whether the operation is completely performed (operation 210). If the communication method of FIG. 7 does not include operation 130, after operation 128, the server 16 or 18 determines whether the operation has been completely performed (operation 210). However, if the communication method of FIG. 7 includes operation 130, the operation 210 is performed after operation 130.

If it is determined that the operation has not been completed, the method proceeds to operation 128 in order to continue the remaining operation. However, if it is determined that the operation has been completed, the server 16 or 18 informs the client 10 or 12 that the operation has been completed (operation 212). Accordingly, the client 10 or 12 which is to be provided with the scanned document can recognize that the server 16 or 18 has completed scanning, recognize the beginning and end of the scanned document, and concludes the state of the client 10 or 12 itself connected to the server 16 or 18.

A communication method according to the present invention, in which a server and a client perform multiple functions by mutually transceiving the above-described transmission packet of the present invention via a network (i.e., a network multi-function peripheral protocol (NMFPP)), can be designed independently from the operating systems (OS) of the server and the client and can be located higher than or on a level equal to an application protocol in a protocol hierarchy. Here, in the protocol hierarchy, a protocol is written in more language as it approaches from a lower layer to an upper layer, and is written in more codes as it approaches from an upper layer to a lower layer.

The NMFPP can also be operated in a security environment. To do this, a security protocol would be used. However, the shown NMFPP does not include extra information for security.

The servers 16 or 18 of FIG. 1 can have an attribute group and a data group that differ according to the manufacturer of the server 16 or 18. Hence, if the client 10 or 12 is provided with a proposal of the attribute group and the data group that differ according to the manufacturer of the server 16 or 18, implementation of the same communication apparatuses can be prevented, and the inter-operability of information processing can be easily obtained. However, even though the client 10 or 12 is not provided with such a proposal, the client 10 or 12 can transceive the attribute group and data group with the server 16 or 18 through requests and responses.

Hereinafter, in order to facilitate the understanding of the communication method of performing multiple functions using the above-described transmission packet of the present invention, the format of an example packet transmitted between the client 10 or 12 and the server 16 or 18 will be described with reference to the following tables. For the example, the server 16 or 18 has a 300 dpi (dot per inch) printer, a 600 dpi scanner having an automatic document feeder (ADF), and a dual line facsimile. In this case, when operation 120 of FIG. 7 is performed, the client 10 or 12 can broadcast, for example, a packet as shown in Table 7 to the server.

TABLE 7

| Hexa value | Symbol value | Reference number denoting field |
|---|---|---|
| 0x0100 | 1.0 (where 1 denotes a major version number and 0 denotes a minor version number) | 20 |
| 0x01 | For request | 22 |
| 0xFF | For all operations | 24 |
| 0x05 | Information attributes of server | 40 |
| 0x001D | 29 bytes | 60 |
| std-device-printer-resolution | To obtain resolution | 62 |
| 0x04 | Unsigned word | 64 |
| 0x0002 | 2 bytes | 66 |
| 0x012C | 300 dpi (client requires a printer with a 300 dpi resolution) | 68 |
| 0x05 | Information attributes of server | 40 |
| 0x0016 | 22 bytes | 60 |
| std-device-print-color | Color printer | 62 |
| 0x02 | Unsigned byte | 64 |
| 0x0001 | 1 byte | 66 |
| 0x01 | True (here, true denotes that a client requires a color printer) | 68 |
| 0x05 | Information attributes of server | 40 |
| 0x001D | 29 bytes | 60 |
| std-device-scanner-resolution | Resolution of scanner | 62 |
| 0x02 | Unsigned word | 64 |
| 0x0002 | 2 bytes | 66 |
| 0x0258 | 600 dpi (client requires a scanner with a 600 dpi resolution) | 68 |
| 0x05 | Information attributes of server | 40 |
| 0x0016 | 22 bytes | 60 |
| std-device-scanner-adf | Scanner having ADF | 62 |
| 0x02 | Unsigned byte | 64 |
| 0x0001 | 1 byte | 66 |
| 0x01 | True (here, true denotes that a client requires a scanner having ADF) | 68 |
| 0x05 | Information attributes of server | 40 |
| 0x13 | 19 bytes | 60 |
| std-device-fax-dual | Server having a dual fax ability | 62 |
| 0x02 | Unsigned byte | 64 |
| 0x0001 | 1 byte | 66 |
| 0x01 | True (here, true denotes that a client requires a server having a dual fax ability) | 68 |
| 0x00 | End of packet | 30 |

When a transmission packet carrying such requests as mentioned in Table 7 is broadcasted from the client 10 or 12 to the server 16 or 18, the server 16 or 18 can send a response as shown in Table 8 to the client 10 or 12.

TABLE 8

| Hexa value | Symbol value | Reference number denoting field |
|---|---|---|
| 0x0100 | 1.0 | 20 |
| 0x02 | For request | 22 |
| 0xFF | For all operations | 24 |
| 0x05 | information attributes of server | 40 |
| 0x001A | 26 bytes | |
| std-device-MFP-name | Name of server | 62 |
| 0x09 | String | 64 |
| 0x0006 | 6 bytes | 66 |
| tiger | The name of printer is tiger | 68 |
| 0x05 | information attributes of server | 40 |
| 0x0017 | 23 bytes | 60 |
| std-device-IP-address | IP address of server | 62 |
| 0x0A | IP address form | 64 |
| 0x0004 | 4 bytes | 66 |
| A8DB0249 | 168.219.2.72 | 68 |
| 0x00 | End of packet | 30 |

In this case, when operation 122 is performed, the client 10 or 12 can transmit a packet as shown in Table 9 to the discovered server 16 or 18.

TABLE 9

| Hexa value | Symbol value | Reference number denoting field |
|---|---|---|
| 0x0100 | 1.0 | 20 |
| 0x01 | For request | 22 |
| 0x03 | For printing and scanning | 24 |
| 0x15 | Printing information attributes | 40 |
| 0x0017 | 23 bytes | 60 |
| std-device-driver-URL | Printer driver URL information | 62 |
| 0x09 | String | 64 |
| 0x0002 | 2 bytes | 66 |
| "?" | Where is URL? | 68 |
| 0x25 | Scanning information attributes | 40 |
| 0x001E | 30 bytes | 60 |
| std-scanner-driver-URL | Scanner driver URL | 62 |
| 0x09 | String | 64 |
| 0x001A | 2 bytes | 66 |
| "?" | Where is URL? | 68 |
| 0x00 | End of packet | 30 |

When a transmission packet carrying such requests as mentioned in Table 9 is broadcasted from the client 10 or 12 to the server 16 or 18, the server 16 or 18 can send a response such as shown in Table 10 to the client 10 or 12.

TABLE 10

| Hexa value | Symbol value | Reference number denoting field |
|---|---|---|
| 0x0100 | 1.0 | 20 |
| 0x02 | For request | 22 |
| 0x03 | For printing and scanning | 24 |
| 0x15 | Printing information attributes | 40 |
| 0x0016 | 22 bytes | 60 |
| std-device-driver-URL | Printer driver URL information | 62 |

TABLE 10-continued

| Hexa value | Symbol value | Reference number denoting field |
|---|---|---|
| 0x09 | String | 64 |
| 0x001E | 30 bytes | 66 |
| Mnfp://www.sec.co.kr/printer/ | A place that obtains a printer driver is the web site of | 68 |
| Mnfp://www.sec.co.kr/printer/ | printer driver is the web site of SAMSUNG printer driver | |
| 0x25 | Scanning information attributes | 40 |
| 0x0016 | 22 bytes | 60 |
| std-scanner-driver-URL | Scanner driver URL | 62 |
| 0x09 | String | 64 |
| 0x001A | 26 bytes | 66 |
| mnfp://www.sec.co.kr/mfp/ | A place that obtains a scanner driver is the web site of SAMSUNG scanner driver | 68 |
| 0x00 | End of packet | 30 |

In this case, when operation 126 is performed, the client 10 or 12 can transmit, for example, a packet as shown in Table 11 to the selected server 16 or 18.

TABLE 11

| Hexa value | Symbol value | Reference number denoting field |
|---|---|---|
| 0x0100 | 1.0 | 20 |
| 0x01 | For request | 22 |
| 0x87 | For printing, scanning, and faxing | 24 |
| 0x13 | Printing control attributes | 40 |
| 0x0024 | 36 bytes | 60 |
| std-printer-control-subscribe-status | Service of notifying the state of subscribed printer | 62 |
| 0x0A | IP address | 64 |
| 0x0004 | 4 bytes | 66 |
| A8DB0249 | 168.219.2.72 (client having such an IP address requires server status to be asynchronously notified) | 68 |
| 0x23 | Scanning control attributes | 40 |
| 0x0022 | 34 bytes | 60 |
| std-scanner-control-subscribe-scan | Subscribing of scanning operation (event is scanned when user depresses the scan button) | 62 |
| 0x0A | IP address | 64 |
| 0x0004 | 4 bytes | 66 |
| A8DB0249 | 168.219.2.72 (client having such an IP address requires scanned document to be asynchronously notified) | 68 |
| 0x33 | Faxing control attributes | 40 |
| 0x001A | 26 bytes | 60 |
| std-fax-control-subscribe-injob | Notification and subscribing of incoming faxing operation | 62 |
| 0x0A | IP address | 64 |
| 0x0004 | 4 bytes | 66 |
| A8DB0249 | 168.219.2.72 (client having such an IP address requires incoming faxing operation to be asynchronously notified) | 68 |
| 0x03 | Server control attributes | 40 |
| 0x0023 | 35 bytes | 60 |
| std-device-control-subscribe-status | Subscribing of server status | 62 |

TABLE 11-continued

| Hexa value | Symbol value | Reference number denoting field |
|---|---|---|
| 0x0A | IP address | 64 |
| 0x0004 | 4 bytes | 66 |
| A8DB0249 | 168.219.2.72 (client having such an IP address requires server status to be asynchronously notified) | 68 |
| 0x00 | End of packet | 30 |

In operation 128, the client 10 or 12 may transmit such a packet as shown in Table 12 to the server 16 or 18 in order to require the server 16 or 18 to perform printing.

TABLE 12

| Hexa value | Symbol value | Reference number denoting field |
|---|---|---|
| 0x0100 | 1.0 | 20 |
| 0x01 | For request | 22 |
| 0x01 | For printing | 24 |
| 0x11 | Printing operation attributes | 40 |
| 0x15 | 21 bytes | 60 |
| std-printjob-charset | Attributes of character sets for printing | 62 |
| 0x09 | String | 64 |
| 0x08 | 8 bytes | 66 |
| US-ASCII | US-ASCII (character sets used for printing are US-ASCII characters) | 68 |
| 0x11 | Printing operation attributes | 40 |
| 0x1E | 30 bytes | 60 |
| std-printjob-natural-language | Natural language attributes | 62 |
| 0x09 | String | 64 |
| 0x06 | 6 bytes | 66 |
| en-US | en-US (natural language used for printing is US language) | 68 |
| 0x11 | Printing operation attributes | 40 |
| 0x10 | 16 bytes | 60 |
| std-printer-URL | Printer-URL | 62 |
| 0x09 | String | 64 |
| 0x1C | 28 bytes | 66 |
| nmfpp://workgroup/mfp/tiger | Multi-function peripheral, called tiger, in work group on network using packet according to the present invention | 68 |
| 0x11 | Printing operation attributes | 40 |
| 0x12 | 18 bytes | 60 |
| std-printjob-name | Printing operation name | 62 |
| 0x09 | String | 64 |
| 0x0E | 14 bytes | 66 |
| myprintjob.ps | myprintjob.ps Postscript file | 68 |
| 0x11 | Printing operation attributes | 40 |
| 0x14 | 20 bytes | 60 |
| std-printjob-copies | The number of copies | 62 |
| 0x02 | Unsigned byte | 64 |
| 0x01 | 1 byte | 66 |
| 0x02 | two copies | 68 |
| 0x11 | Printing operation attributes | 40 |

TABLE 12-continued

| Hexa value | Symbol value | Reference number denoting field |
|---|---|---|
| 0x17 | 23 bytes | 60 |
| std-printjob-papersize | Paper size attributes | 62 |
| 0x09 | String | 64 |
| 0x07 | 7 bytes | 66 |
| Letter | Letter paper size | 68 |

When a transmission packet carrying such requests as mentioned in Table 12 is transmitted from the client 10 or 12 to the server 16 or 18, the server 16 or 18 can send a response such as shown in Table 13 to the client 10 or 12.

TABLE 13

| Hexa value | Symbol value | Reference number denoting field |
|---|---|---|
| 0x11 | Printing operation attributes | 40 |
| 0x14 | 20 bytes | 60 |
| std-printjob-duplex | Duplex selection | 62 |
| 0x02 | Unsigned byte | 64 |
| 0x01 | 1 byte | 66 |
| 0x01 | Short edge | 68 |
| 0x90 | Printing | 80 |
| 0x01 | Text form | 100 |
| 0x00000FDD | 4061 bytes (data length) | 104 |
| %!PS-Adobe | Printing operation using postscript language | 106 |
| 0x00 | End of packet | 30 |

In operation 128, the client 10 or 12 may transmit a packet such as shown in Table 14 in order to require the server 16 or 18 to perform scanning.

TABLE 14

| Hexa value | Symbol value | Reference number denoting field |
|---|---|---|
| 0x0100 | 1.0 | 20 |
| 0x01 | For request | 22 |
| 0x02 | For scanning | 24 |
| 0x22 | Scanning operation control attributes | 40 |
| 0x17 | 23 bytes | 60 |
| std-scanjobcontrol-resolution | Scanning resolution | 62 |
| 0x04 | Unsigned word | 64 |
| 0x04 | 4 bytes | 66 |
| 0x012C | 300 dpi (which means that document is required to be scanned at 300 dpi) | 68 |
| 0x0021 | Scanning operation attributes | 40 |
| 0x14 | 20 bytes | 60 |
| std-scanjob-user-ID | User ID attributes | 62 |
| 0x09 | String | 64 |
| 0x06 | 6 bytes | 66 |
| Klee4 | User ID is klee4 | 68 |
| 0x22 | Scanning operation control attributes | 40 |
| 0x18 | 24 bytes | 60 |
| std-scanjobcontrol-brightness | Scanning brightness | 62 |
| 0x02 | Unsigned byte | 64 |
| 0x01 | 1 byte | 66 |
| 0x80 | 128 (here, 128 denotes the briqhtness of scanning) brightness of scanning) | 68 |
| 0x22 | Scanning operation control attributes | 40 |

TABLE 14-continued

| Hexa value | Symbol value | Reference number denoting field |
|---|---|---|
| 0x1C | 28 bytes | 60 |
| std-scanjobcontrol-contrast | Contrast of scanning | 62 |
| 0x02 | Unsigned byte | 64 |
| 0x01 | 1 byte | 66 |
| 0x80 | 128 (here, 128 denotes the contrast between maximum value and minimum value) | 68 |
| 0x21 | Scanning operation attributes | 40 |
| 0x13 | 19 bytes | 60 |
| std-scanjob-copies | The number of copies of scanning | 62 |
| 0x02 | Unsigned byte | 64 |
| 0x01 | 1 byte | 66 |
| 0x02 | Copying of 2 copies (which denotes 2 copies per scanned page) | 68 |
| 0x00 | End of packet | 30 |

In operation 128, the client 10 or 12 may transmit a packet such as shown in Table 15 in order to require the server 16 or 18 to perform a faxing operation.

TABLE 15

| Hexa value | Symbol value | Reference number denoting field |
|---|---|---|
| 0x0100 | 1.0 | 20 |
| 0x01 | For request | 22 |
| 0x03 | For faxing | 24 |
| 0x31 | Faxing operation attributes | 40 |
| 0x13 | 19 bytes | 60 |
| std-faxjob-user-ID | User ID attributes | 62 |
| 0x09 | String | 64 |
| 0x06 | 6 bytes | 66 |
| Klee4 | User ID (which denotes the user ID used upon faxing operation) | 68 |
| 0x31 | Faxing operation attributes | 40 |
| 0x12 | 18 bytes | 60 |
| std-faxjob-number | Fax number | 62 |
| 0x02 | Unsigned byte | 64 |
| 0x0C | 13 bytes | 66 |
| 9.032004664 | 9 pause 0312004664 (the dial number of destination) | 68 |
| 0x31 | Faxing operation attributes | 40 |
| 0x19 | 25 bytes | 60 |
| std-faxjob-receiver-name | Name of fax receiver for logging | 62 |
| 0x09 | String | 64 |
| 0x09 | 9 bytes | 66 |
| anonymous | (Name of fax receiver) | 68 |
| 0xB0 | Faxing operation | 80 |
| 0x000000FAA | 4010 bytes | 104 |
| bitmap data | Bitmap data | 80 |
| 0x00 | End of packet | 30 |

As described above, in a transmission packet according to the present invention which is used to perform multiple functions via a network, and a communication method and apparatus using the transmission packet, regardless of a situation of a client (i.e., even when the client does not open an application for scanning or does not instruct scanning), multiple operations including scanning can be performed between a client and a server. For example, a document scanned by the server according to a user's instruction (i.e., the result of an operation process), can be precisely transmitted to the client without errors. Accordingly, a multi-functional server, such as a multi-functional peripheral, can be shared by multiple clients through a network and can be easily accessed by the clients via the network like an analog copying machine is easily accessed. Also, the clients can control the server without the help of a separate management protocol.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A communication method of performing multiple functions using transmission packets, in which selected operations are performed between a client and a server using the transmission packets, the transmission packets providing for at least K (K≧1) operations including scanning, and being transmitted in order to achieve communications between at least one of N (N≧1) servers shared by M (M≧1) clients, the method comprising:
broadcasting a transmission packet requesting a server of the at least one of N servers capable of performing the selected operations, the broadcasted transmission packet including required server attributes relating to printing, scanning and facsimile operations;
discovering the server, by receiving a response transmission packet from the at least one of N servers, indicating that the server has the required server attributes and thus is capable of performing the selected operations;
checking a current status of the server discovered;
selecting the server discovered, to be a server capable of receiving information based on the current status checked of the server discovered;
transmitting a request to require the server selected to asynchronously notify an event; and
performing the selected operations by the server according to another transmission packet that performs at least K operations including scanning,
wherein all of the transmission packets sent and received between the client and the server of the at least one of N servers comprise a same packet field format and comprise:
an operation form display field having operation form display information that represents a form of an operation using a transmission packet among the K operations; and
an attribute group field having first information associated with an attribute of the K operations and/or a data group field having second information associated with data regarding the K operations.

2. The communication method of claim 1, further comprising:
selectively installing a driver and an application used to perform the selected operations using the server discovered and then proceeding to check the current status of the server discovered.

3. The communication method of claim 2, wherein the selectively installing comprises:
requiring the driver and the application to be installed after discovering the server; and
providing and installing the required driver and the application.

4. The communication method of claim 1, after performing the selected operations, further comprising canceling an execution of the selected operations.

5. The communication method of claim 1, after performing the selected operations, further comprising changing an execution of the selected operations.

6. The communication method of claim 1, after performing the selected operations, further comprising pausing the selected operations and resuming the selected operations.

7. The communication method of claim 1, wherein the discovering the server comprises:
broadcasting the required server attributes in order to require the server having the required server attributes to disclose an identity of the server having the required server attributes; and
discovering the server of the at least one of N servers having the required server attributes through responses received from multiple servers including the discovered server.

8. The communication method of claim 1, wherein the required server attributes associated with the server discovered and the selected operations are at least one of a number of operations performed by the server discovered, a spatial location of the server discovered, whether the server discovered can support security, whether the server discovered is needed to be authenticated before being used, whether the server discovered performs the selected operations in color, a resolution of a result of the selected operations performed by the server discovered, and a size of paper which the server discover can handle.

9. The communication method of claim 1, wherein in the checking the current status, an ability of the server as well as a current status of the server discovered are checked.

10. The communication method of claim 9, wherein the checked current status of the server discovered and the ability of the server discovered are at least one of an unchangeable ability of the server discovered, a changeable status of the server discovered, whether the selected operations previously required to be performed by the server discovered exists, a state of execution of the selected operations, whether the selected operations are capable of being performed, and a priority order of execution.

11. The communication method of claim 1, wherein a manner in which the server selected notifies the event varies according to a type of the event.

12. The communication method of claim 1, wherein the event is at least one of the current status of the server discovered, whether the selected operations are completely performed by the server discovered, whether a result of the selected operations exists, whether information necessary to perform the selected operations are needed to be re-transmitted, whether a situation affecting a standing-by operation occurs, and whether effective data to be processed is generated.

13. The communication method of claim 1, wherein the performing the selected operations comprise:
requiring the selected operations to be performed, after the selecting the server discovered;
responding with information on whether the selected operations can be performed; and
performing the selected operations depending on the information on whether the selected operations can be performed.

14. The communication method of claim 13, wherein the performing the selected operations depending on whether the selected operations can be performed comprises:
providing desired attribute and data which are necessary to perform the selected operations; and
performing the selected operations using the desired attribute and data provided.

15. The communication method of claim 1, wherein the performing the selected operations comprises:
designating the server discovered, to be a desired server to perform the selected operations, after selecting the server discovered;
bringing to the designated server desired attribute and data necessary to perform the selected operations; and
performing the selected operations using the desired attribute and data and transmitting a result of the selected operations every time the selected operations are to be performed.

16. The communication method of claim 15, wherein the designating the server discovered, to be the desired server comprises:
providing an identifier and a password of the client;
determining whether the identifier and password that are provided are effective; and
determining the server discovered provided with the identifier and password to be the desired server that is designated, in response to determining that the provided identifier and password are effective, and proceeding to bringing the desired attribute and the data necessary from the client to perform the selected operations, wherein the identifier, the password, and a spatial location of the client are previously provided to the desired server in the selecting the server that is designated.

17. The communication method of claim 13, wherein the performing the selected operations comprise:
determining whether the selected operations have been completed, and proceeding to perform the selected operations depending on the information in response to determining that the operations have not yet been completed, and
notifying that the selected operations have been completed, in response to determining that the selected operations have been completed.

18. The communication method of claim 1, wherein a form of data transmitted between the server discovered and the client is one of a file, raw data, and a designated address.

19. A communication system used to perform multiple functions using transmission packets, in which selected operations are performed using the transmission packets, the transmission packets providing for at least K (K≧1) operations including scanning, and being transmitted in order to achieve communications between N (N≧1) servers shared by M (M≧1), the communication system comprising:
a client which
broadcasts a transmission packet requesting a server of the N servers capable of performing the selected operations, the broadcasted transmission packet including required server attributes relating to printing, scanning and facsimile operations, in order to require the server having the required attributes to disclose an identity of the server,
generates a request to check a current status of the server having the disclosed identity,
selects the server having the disclosed identity, as being capable of receiving information using the server status checked, generates a request to asynchronously notify an event, and
transmits attributes and data necessary to perform the operations to the server; and
the server which
responds via a transmission packet indicating whether the server has the required server attributes,
responds to the request for the current status of the server,
responds to the request for asynchronously notifying of the event,
receives the attributes and data transmitted necessary to perform the selected operations via another transmission packet, and performs the selected operations using the received attributes and data, wherein the server performs the selected operations according to the attributes and data of the another transmission packet that performs at least K operations including scanning, and wherein all of the transmission packets sent and received between the client and the server of the N servers comprise a same packet field format and comprise:

an operation form display field having operation form display information that represents a form of an operation using a transmission packet among the K operations; and an attribute group field having first information associated with an attribute of the K operations and/or a data group field having second information associated with data regarding the K operations.

20. The communication system of claim 19, wherein:

if the client requires a driver to perform the selected operations and a necessary application from a disclosed server having the required server attributes, the client installs the driver and the necessary application received from the disclosed server, and the disclosed server provides the driver and the necessary application required by the client to the client.

21. The communication system of claim 19, wherein the client requires the server to cancel or change an execution of a previously required operation.

22. The communication system of claim 19, wherein the client requires the server to pause performing a previously required operation and to resume the previously required operation.

23. The communication system of claim 19, wherein the client checks an ability of the server together with the current status of the server.

24. The communication system of claim 19, wherein the client requires the server to perform the selected operations and provides the attributes and data necessary to perform the selected operation in another transmission packet to the server, and the server responds with information on whether the server can perform the selected operations and performs the selected operations using the received attributes and data.

25. The communication system of claim 19, wherein a user desiring to perform an operation designates the server as desired server to perform the operation, and the server obtains the attributes and data necessary to perform the operation from the client, performs the operation using the attributes and data, and transmits a result of the operation to the client every time the operation is performed.

26. The communication system of claim 25, wherein the user provides an identifier of the client and a password of the client to the server, the server checks whether the identifier and password provided by the user are effective and is determined as the server designated in response to a check result, and the client previously provides the identifier, Cthe password, and a spatial location of the client to the server.

27. The communication system of claim 24, wherein the server checks whether the selected operations are completed performed, and notifies the client that the selected operations have been completed in response to a checked result.

28. A client apparatus which communicates with a server using transmission packets to select and perform at least one of multiple operations, each transmission packet performing at least K (K≧1) operations including scanning, being transmitted in order to achieve communications between at least one of N (N≧1) servers shared by M (M≧1) clients, wherein the client apparatus configured to:

broadcast using one transmission packet, a request requesting a server of the least one of N servers capable of performing the at least one of multiple operations, the one transmission packet including required server attributes relating to printing, scanning, and facsimile operations, in order to require an identification of a server, of the at least one of N servers, having the required server attributes, to disclose an identity of the server having the required server attributes, identify the server of the at least one of N servers having the required server attributes by receiving a response transmission packet from the at least one of N servers, indicating that the server has the required server attributes;

use another transmission packet to select the identified server of the at least one of N servers as being capable of receiving information, transmit a request to require the server selected to asynchronously notify an event, and use an additional transmission packet to transmit attributes or data necessary to perform the at least one of multiple operations using the server selected, wherein the server selected performs the at least one of multiple operations using the transmission packet that performs at least K operations including scanning, and wherein all of the transmission packets sent and received between the client and the server of the least one of N servers comprise a same packet field format and comprise:

an operation form display field having operation form display information that represents a form of an operation using a transmission packet among the K operations; and an attribute group field having first information associated with an attribute of the K operations and/or a data group field having second information associated with data regarding the K operations.

29. A server apparatus which receives requests from a client using transmission packets so as to select at least one operation from multiple operations, each transmission packet performing at least K (K≧1) operations including scanning, being transmitted in order to achieve communications between N (N≧1) servers shared by M (M≧1) clients, the server apparatus is configured to:

use one transmission packet to respond to a received request, within another transmission packet from the client in which required server attributes relating to printing, scanning, and facsimile operations are included, the server apparatus identifying itself in the one transmission packet when the server apparatus has the required server attributes, and receive and respond to a request from the client to require the server apparatus to asynchronously notify an event, use a further transmission packet to receive attributes and data necessary to perform the selected at least one operation required by the client, and performs the at least one operation using the attributes and data that are received, wherein the server apparatus performs the selected at least one operation using a transmission packet that performs at least K operations including scanning, and wherein all of the transmission packets sent and received between the client and the server apparatus comprise a same packet field format and comprise:

an operation form display field having operation form display information that represents a form of an operation using transmission packet among the K operations; and an attribute group field having first information associated with an attribute of the K operations and/or a data group field having second information associated with data regarding the K operations.

* * * * *

UNITED STATES PATENT AND TRADEMARK OFFICE
CERTIFICATE OF CORRECTION

PATENT NO.         : 7,660,907 B2                                          Page 1 of 1
APPLICATION NO.    : 10/377667
DATED              : February 9, 2010
INVENTOR(S)        : Kang-hoon Lee It is certified that error appears in the above-identified patent and that said Letters Patent is hereby corrected as shown below:

Column 21, Line 53, change "Cthe" to --the--.

Column 21, Line 56, change "completed" to --completely--.

Column 21, Line 63, after "clients," delete "wherein".

Column 22, Line 24, change "least" to --at least--.

Column 22, Line 63, change "using" to --using a--.

Signed and Sealed this

Fourth Day of May, 2010

David J. Kappos
*Director of the United States Patent and Trademark Office*